Patented July 26, 1938

2,124,566

UNITED STATES PATENT OFFICE 2,124,566

CONVERSION OF HYDROCARBONS

Aristid V. Grosse, Chicago, Ill., assignor to Universal Oil Products Company, Chicago, Ill., a corporation of Delaware

REISSUED
OCT 1 - 1940

No Drawing. Application September 30, 1936, Serial No. 103,395

4 Claims. (Cl. 260—668)

This invention relates more particularly to the conversion of straight chain hydrocarbons into closed chain or cyclic hydrocarbons.

More specifically it is concerned with a process involving the use of special catalysts and specific conditions of operation in regard to temperature, pressure and time of reaction whereby aliphatic hydrocarbons can be efficiently converted into aromatic hydrocarbons.

In the straight pyrolysis of pure hydrocarbons or hydrocarbon mixtures such as those encountered in fractions from petroleum or other naturally occurring or synthetically produced hydrocarbon mixtures the reactions involved which produce aromatics from paraffins and olefins are of an exceedingly complicated character and cannot be very readily controlled.

It is generally recognized that in the thermal decomposition of hydrocarbon compounds or hydrocarbon mixtures of relatively narrow range that whatever intermediate reactions are involved, there is an overall loss of hydrogen, a tendency to carbon separation and a generally wider boiling range in the total liquid products as compared with the original charge. Under mild cracking conditions involving relatively low temperatures and pressures and short times of exposure to cracking conditions it is possible to some extent to control cracking reactions so that they are limited to primary decompositions and there is a minimum loss of hydrogen and a maximum production of low boiling fractions consisting of compounds representing the fragments of the original high molecular weight compounds.

As the conditions of pyrolysis are increased in severity using higher temperatures and higher times of exposure to pyrolytic conditions, there is a progressive increase in loss of hydrogen and a large amount of secondary reactions involving recombination of primary radicals to form polymers and some cyclization to form naphthenes and aromatics, but the mechanisms involved in these cases are of so complicated a nature that very little positive information has been evolved in spite of the large amount of experimentation which has been done and the large number of theories proposed. In general, however, it may be said that starting with paraffin hydrocarbons representing the highest degree of saturation that these compounds are changed progressively into olefins, naphthenes, aromatics, and finally into carbon and hydrogen and other light fixed gases. It is not intended to infer from this statement that any particular success has attended the conversion of any given paraffin or other aliphatic hydrocarbon into an aromatic hydrocarbon of the same number of carbon atoms by way of the progressive steps shown. If this is done it is usually with very low yields which are of very little practical significance.

The search for catalysts to specifically control and accelerate desired conversion reactions among hydrocarbons has been attended with the usual difficulties encountered in finding catalysts for other types of reactions since there are no basic laws or rules for predicting the effectiveness of catalytic materials and the art as a whole is in a more or less empirical state. In using catalysts even in connection with conversion reactions among pure hydrocarbons and particularly in connection with the conversion of the relatively heavy distillates and residue which are available for cracking, there is a general tendency for the decomposition reactions to proceed at a very rapid rate, necessitating the use of extremely short time factors and very accurate control of temperature and pressure to avoid too extensive decomposition. There are further difficulties encountered in maintaining the efficiency of catalysts employed in pyrolysis since there is usually a rapid deposition of carbonaceous materials on their surfaces and in their pores.

The foregoing brief review of the art of hydrocarbon pyrolysis is given to furnish a general background for indicating the improvement in such processes which is embodied in the present invention, which may be applied to the treatment of pure paraffin or olefin hydrocarbons, hydrocarbon mixtures containing substantial percentages of paraffin hydrocarbons such as relatively close cut fractions producible by distilling petroleum, and analogous fractions which contain unsaturated as well as saturated straight chain hydrocarbons, such fractions resulting from cracking operations upon the heavier fractions of petroleum.

In one specific embodiment the present invention comprises the conversion of aliphatic hydrocarbons including paraffin and olefin hydrocarbons into aromatic hydrocarbons by subjecting them at elevated temperatures of the order of 400-700° C. to contact for definite times of the order of 6-50 seconds with catalytic materials comprising major proportions of compounds of elements selected from those occurring in the left-hand column of Group VI of the periodic table, these compounds having relatively high catalytic activity.

According to the present invention aliphatic or straight chain hydrocarbons having six or more carbon atoms in chain arrangement in their structure are specifically dehydrogenated in such a way that the chain of carbon atoms undergoes ring closure with the production in the simplest case of benzene from n-hexane or n-hexene and in the case of higher molecular weight paraffins of various alkyl derivatives of benzene. Under properly controlled conditions of times of contact, temperature and pressure very high yields of the order of 75 to 90% of the benzene or aromatic compounds are obtainable which are far in excess of any previously obtained in the art either with or without catalysts. For the sake of illustrating and exemplifying the types of hydrocarbon conversion reactions which are specifically accelerated under the preferred conditions by the present types of catalysts, the following structural equations are introduced.

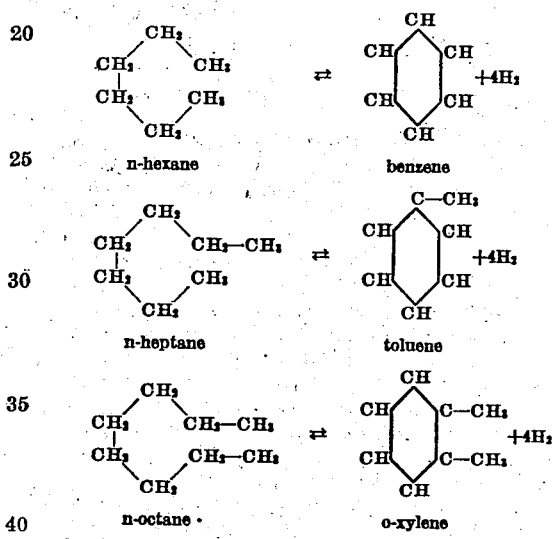

In the foregoing table the structural formulas of the primary paraffin hydrocarbons have been represented as a nearly closed ring instead of by the usual linear arrangement for the sake of indicating the possible mechanisms involved. No attempt has been made to indicate the possible intermediate existence of mono-olefins, diolefins, hexamethylenes or alkylated hexamethylenes which might result from the loss of various amounts of hydrogen. It is not known at the present time whether ring closure occurs at the loss of one hydrogen molecule or whether dehydrogenation of the chain carbons occurs so that the first ring compound formed is an aromatic such as benzene or one of its derivatives. The above three equations are of a relatively simple character indicating generally the type of reactions involved but in the case of n-paraffins or mono-olefins of higher molecular weight than the octane shown and in the case of branch chain compounds which contain various alkyl substituent groups in different positions along the six-carbon atom chain, more complicated reactions will be involved. For example, in the case of such a primary compound as 2,3-dimethyl hexane the principal resultant product is apparently o-xylene although there are concurrently produced definite yields of such compounds as ethyl benzene indicating an isomerization of two substituent methyl groups. In the case of nonanes which are represented by the compound 2,3,4-trimethyl hexane, there is formation not only of mesitylene but also of such compounds as methyl ethyl benzol and various propyl benzols.

It will be seen from the foregoing that the scope of the present invention is preferably limited to the treatment of aliphatic hydrocarbons which contain at least 6 carbon atoms in straight chain arrangement. In the case of paraffin hydrocarbons containing less than 6 carbon atoms in linear arrangement, some formation of aromatics may take place due to primary isomerization reactions although obviously the extent of these will vary considerably with the type of compound and the conditions of operation. The process is readily applicable to paraffins from hexane up to dodecane and their corresponding olefins. With increase in molecular weight beyond this point the percentage of undesirable side reactions tends to increase and yields of the desired alkylated aromatics decrease in proportion.

The present invention is characterized by the use of a particular group of composite catalytic materials which employ as their base catalysts certain refractory oxides and silicates which in themselves may have some slight specific catalytic ability in the dehydrogenation and cyclization reactions but which are improved greatly in this respect by the addition of certain promoters or secondary catalysts in minor proportions. These base supporting materials are preferably of a rugged and refractory character capable of withstanding the severe use to which the catalysts are put in regard to temperature during service and in regeneration by means of air or other oxidizing gas mixtures after they have become fouled with carbonaceous deposits after a period of service. As examples of materials which may be employed in granular form as supports for the preferred catalytic substances may be mentioned the following:

Magnesium oxide  
Aluminum oxide  
Bauxite  
Bentonite clays  
Glauconite (greensand)  
Montmorillonite clays  
Kieselguhr  
Crushed firebrick  
Crushed silica It should be emphasized that in the field of catalysis there have been very few rules evolved which will enable the prediction of what materials will catalyze a given reaction. Most of the catalytic work has been done on a purely empirical basis, even though at times certain groups of elements of compounds have been found to be more or less equivalent in accelerating certain types of reactions.

In regard to the base catalytic materials which are preferably employed according to the present invention, some precautions are necessary to insure that they possess proper physical and chemical characteristics before they are impregnated with the promoters to render them more efficient. In regard to magnesium oxide, which may be alternatively employed, this is most conveniently prepared by the calcination of the mineral magnesite which is most commonly encountered in a massive or earthy variety and rarely in crystal form, the crystals being usually rhombohedral. In many natural magnesites the magnesium oxide may be replaced to the extent of several percent by ferrous oxide. The mineral is of quite common occurrence and readily obtainable in quantity at a reasonable figure. The pure compound begins to decompose to form the oxide at a temperature of 350° C., though the rate of decomposition only reaches a practical value at considerably higher temperatures, usually of the order of 800° C. to 900° C. Magnesite is related to dolomite, the mixed carbonate of calcium and magnesium, which latter mineral, however, is not of as good service as the relatively pure magnesite in the present instance. Magnesium carbonate prepared by precipitation or other chemical methods may be used alternatively in place of the natural mineral, this permitting its use as the active constituent of masses containing spacing materials of relatively inert character and in some cases allowing the production of catalysts of higher efficiency and longer life. It is not necessary that the magnesite be completely converted to oxide but as a rule it is preferable that the conversion be at least over 90%, that is, so that there is less than 10% of the carbonate remaining in the ignited material.

Aluminum oxide which is generally preferable as a base material for the manufacture of catalysts for the process may be obtained from natural aluminum oxide minerals or ores such as bauxite or carbonates such as dawsonite by proper calcination, or it may be prepared by precipitation of aluminum hydrate from solutions of aluminum sulfate or different alums, and dehydration of the precipitate of aluminum hydroxide by heat, and usually it is desirable and advantageous to further treat it with air or other gases, or by other means to activate it prior to use.

Two hydrated oxides of aluminum occur in nature, to-wit, bauxite having the formula $Al_2O_3 2H_2O$ and diaspore $Al_2O_3 H_2O$. In both of these oxides iron sesqui-oxide may partially replace the alumina. These two minerals or corresponding oxides produced from precipitated aluminum hydroxide are adaptable for the manufacture of the present type of catalysts and in some instances have given the best results of any of the base compounds whose use is at present contemplated. The mineral dawsonite having the formula $Na_3Al(CO_3)_3.2Al(OH)_3$ is another mineral which may be used as a source of aluminum oxide.

It is best practice in the final steps of preparing aluminum oxide as a base catalyst to ignite for some time at temperatures within the same approximate range as those employed in the ignition of magnesite, to-wit, from 800–900° C. This probably does not correspond to complete dehydration of the hydroxides but apparently gives a catalytic material of good strength and porosity so that it is able to resist for a long period of time the deteriorating effects of the service and regeneration periods to which it is subjected. In the case of the clays which may serve as base catalytic materials for supporting promoters, the better materials are those which have been acid-treated to render them more siliceous. These may be pelleted or formed in any manner before or after the addition of the promoter catalyst since ordinarily they have a high percentage of fines. The addition of certain of the promoters, however, exerts a binding influence so that the formed materials may be employed without fear of structural deterioration in service.

My investigations have also definitely demonstrated that the catalytic efficiency of such substance as alumina, magnesium oxide, and clays which may have some catalytic potency in themselves is greatly improved by the presence of compounds of the preferred elements in relatively minor amounts, usually of the order of less than 10% by weight of the carrier. It is most common practice to utilize catalysts comprising 2 to 5% by weight of these compounds, particularly their lower oxides.

The promoters which are used in accordance with the present invention to produce active catalysts of the base materials include generally compounds and more particularly oxides of the elements in the lefthand column of Group VI of the periodic table including the elements chromium, molybdenum, tungsten, and uranium. In general practically all of the compounds of the preferred elements will have some catalytic activity though as a rule the oxides and particularly the lower oxides are the best catalysts. Catalyst composites may be prepared by utilizing the soluble compounds of the elements in aqueous solutions from which they are absorbed by prepared granular carriers or from which they are deposited upon the carriers by evaporation of the solvent. The invention further comprises the use of catalyst composites made by mixing relatively insoluble compounds with carriers either in the wet or the dry condition. In the following paragraphs some of the compounds of the elements listed above are given which are soluble in water and which may be used to add catalytic material to carriers. The known oxides of these elements are also listed.

Chromium

The preferred catalysts in the case of chromium comprise essentially mixtures of major amounts of inert carriers and minor amounts of compounds of chromium such as for example, the oxides $CrO_3$, $CrO_2$, and particularly the sesqui-oxide $Cr_2O_3$, which results from the reduction of the two higher oxides. The oxides mentioned are particularly efficient as catalysts for the present types of reactions but the invention is not limited to their use but may employ any of the catalytically active compounds of chromium which may be either deposited upon the carriers from aqueous or other solutions in the course of the preparation of the composites or which may be mechanically admixed therewith either in the wet or the dry condition. Such compounds as chromic acid $H_2CrO_4$ prepared by dissolving the trioxide in water, and chromium nitrate $Cr(NO_3)_3$, are readily soluble in water at ordinary temperatures and their solutions are therefore utilizable for adding compounds to various carriers which can be later ignited to leave a residue of the trioxide which is readily reducible by hydrogen at 250° C. to form the green sesquioxide and is ordinarily reduced in the early stage of a run on the vapors of some paraffin hydrocarbon. Alternatively, if desired, chromium hydroxides may be precipitated from aqueous solutions onto suspended particles of carriers by the use of such precipitants as the hydroxides and carbonates of the alkali metals or ammonium. Among other soluble compounds which may be added to carriers from aqueous solution may be mentioned chromium ammonium sulfate, chromium chlorides, chromium fluoride, chromium potassium cyanide, chromium sulfates, double salts of chromium in the alkali metals such as chromium potassium sulfate and the alkali metal salts of the various acids of chromium.

Molybdenum

It is common practice to utilize catalysts comprising 2 to 5 percent by weight of the lower oxides of molybdenum, such as the sesquioxide $Mo_2O_3$ and the dioxide $MoO_2$. While the oxides mentioned are particularly efficient as catalysts for the present types of reactions, the invention is not limited to their use but may employ other compounds of molybdenum. Numerous readily soluble molybdenum compounds may be used in solution to add the catalysts to the carrier. As examples of such soluble compounds may be mentioned molybdenum pentachloride in hydrochloric acid solution, molybdic oxide dissolved in aqueous ammonia or nitric acid and ammonium molybdate. Other soluble compounds are the tetrabromide, the oxychloride, and the basic thiocyanate. Compounds of molybdenum which are insoluble in water or other ordinary solvents may be mixed mechanically with the alumina either in the dry or moist condition.

Tungsten

Oxides of tungsten, such as the sesquioxide $W_2O_3$ and the dioxide $WO_2$ which result from the reduction of the trioxide $WO_3$ are particularly efficient as catalysts for the present types of reactions, though the invention is not limited to their use but may employ other compounds of tungsten. Tungsten trioxide dissolves readily in aqueous ammonia solutions and may thus be conveniently used as an ultimate source of tungstic acids, which correspond to various degrees of hydration of the trioxide and which may be ignited to form the trioxide. Alternately the tungstic acids may be precipitated from solutions in water by the use of ammonium or alkali metal hydroxides or carbonates as precipitants, the hydroxide being later ignited to form mixtures of the trioxide and the dioxide, which may undergo reduction by hydrogen or the gases and vapors in contact with the catalyst in the normal operation of the process.

Uranium

In regard to uranium, which is the heaviest member of the present natural group of elements whose compounds are preferred as catalysts, it may merely be stated that while this element furnishes catalytic compounds having a relatively high order of activity, its scarcity and cost naturally precludes its extensive use in practice. Uranium shows a series of oxides including the dioxide $UO_2$, a trioxide $UO_3$, a hydrated peroxide $UO_4.2H_2O$ and an oxide $U_3O_8$ characteristic of pitchblende. Any of these oxides may be used as catalysts as well as some of the other compounds of this element.

The most general method for adding promoting materials to the preferred base catalysts, which if properly prepared have a high adsorptive capacity, is to stir the prepared granules of from approximately 4 to 20 mesh into solutions of salts which will yield the desired promoting compounds on ignition under suitable conditions. In some instances the granules may be merely stirred in slightly warm solutions of salts until the dissolved compounds have been retained on the particles by absorption or occlusion, after which the particles are separated from the excess solvent by settling or filtration, washed with water to remove excess solution, and then ignited to produce the desired residual promoter. In cases of certain compounds of relatively low solubility it may be necessary to add the solution in successive portions to the adsorbent base catalyst with intermediate heating to drive off solvent in order to get the required quantity of promoter deposited upon the surface and in the pores of the base catalyst. The temperatures used for drying and calcining after the addition of the promoters from solutions will depend entirely upon the individual characteristics of the compound added and no general ranges of temperature can be given for this step.

In some instances promoters may be deposited from solution by the addition of precipitants which cause the deposition of precipitates upon the catalyst granules. As a rule methods of mechanical mixing are not preferable, though in some instances in the case of hydrated or readily fusible compounds these may be mixed with the proper proportions of base catalysts and uniformly distributed during the condition of fusing or fluxing.

In regard to the relative proportions of base catalyst and promoting materials it may be stated in general that the latter are generally less than 10% by weight of the total composites. The effect upon the catalytic activity of the base catalysts caused by varying the percentage of any given compound or mixture of compounds deposited thereon is not a matter for exact calculation but more one for determination by experiment. Frequently good increases in catalytic effectiveness are obtainable by the deposition of as low as 1% or 2% of a promoting compound upon the surface and in the pores of the base catalyst, though the general average is about 5%.

It has been found essential to the production of high yields of aromatics from aliphatic hydrocarbons when using the preferred types of catalysts that depending upon the aliphatic hydrocarbon or mixture of hydrocarbons being treated, temperatures from 400–700° C. should be employed, contact times of approximately 6 to 50 seconds and pressures approximating atmospheric. The use of subatmospheric pressures of the order of 1/4 atmospheres may be beneficial in that reduced pressures generally favor selective dehydrogenation reactions but on the other hand moderately superatmospheric pressures usually of the order of less than 100 lbs. per sq. in. tend to increase the capacity of commercial plant equipment so that in practice a balance is struck between these two factors. The times of contact most commonly employed with n-paraffinic or mono-olefinic hydrocarbons having from 6–12 carbon atoms to the molecule are of the order of 6–20 secs. It will be appreciated by those familiar with the art of hydrocarbon conversion in the presence of catalysts that the factors of temperature, pressure and time will frequently have to be adjusted from the results of preliminary experiments to produce the best results in any given instance. The criterion of the yield of aromatics will serve to fix the best conditions of operation. In a general sense the relations between time, temperature and pressure are preferably adjusted so that rather intensive conditions are employed of sufficient severity to insure a maximum amount of the desired cyclization reactions with a minimum of undesirable side reactions. If too short times of contact are employed the conversion reactions will not proceed beyond those of simple dehydrogenation and the yields of olefins and diolefins will predominate over those of aromatics.

While the present process is particularly applicable to the production of the corresponding aromatics from an aliphatic hydrocarbon or a mixture of aliphatic hydrocarbons, the invention may also be employed to produce aromatics from aliphatic hydrocarbon mixtures such as distillates from paraffinic or mixed base crude petroleum. In this case the aromatic character of the distillates will have increased and as a rule the octane number will be higher. If desired and found feasible on a basis of concentration, the aromatics produced in the hydrocarbon mixture may be recovered as such by distillation into fractions of proper boiling range followed by chemical treatment with reagents capable of reacting selectively with them. Another method of aromatic concentration will involve the use of selective solvents such as liquid sulfur dioxide, alcohols, furfural, chlorex, etc.

In operating the process the general procedure is to vaporize hydrocarbons or mixtures of hydrocarbons and after heating the vapors to a suitable temperature within the ranges previously specified to pass them through stationary masses of granular catalytic material in vertical cylindrical treating columns or banks of catalyst-containing tubes in parallel connection. Since the reactions are endothermic it may be necessary to apply some heat externally to maintain the best reaction temperature. After passing through the catalytic zone the products are submitted to fractionation to recover cuts or fractions containing the desired aromatic product with the separation of fixed gases, unconverted hydrocarbons and heavier residual materials, which may be disposed of in any suitable manner depending upon their composition. The overall yield of aromatics may be increased by recycling the unconverted straight chain hydrocarbons to further treatment with fresh material, although this is a more or less obvious expedient and not specifically characteristic of the present invention.

It is an important feature of the present process that the vapors undergoing dehydrogenation should be free from all but traces of water vapor since the presence of any substantial amounts of steam reduces the catalytic selectivity of the composite catalysts to a marked degree. In view of the empirical state of the catalytic art, it is not intended to submit a complete explanation of the reasons for the deleterious influence of water vapor on the course of the present type of catalyzed reactions, but it may be suggested that the action of the steam is to cause a partial hydration of such basic carriers as alumina and magnesium oxide and some of the active catalytic compounds due to preferential adsorption so that in effect the hydrocarbons are prevented from reaching or being adsorbed by the catalytically active surface.

The present types of catalysts are particularly effective in removing hydrogen from chain compounds in such a way that cyclization may be promoted without removal of hydrogen from end carbon atoms so that both end and side alkyl groups may appear as substituents in benzene rings and it has been found that under proper operating conditions they do not tend to promote any great amount of undesirable side reactions leading to the deposition of carbon or carbonaceous materials and for this reason show reactivity over relatively long periods of time. When their activity begins to diminish after a period of service, it is readily regenerated by the simple expedient of oxidizing with air or other oxidizing gas at a moderately elevated temperature, usually within the range employed in the dehydrogenation and cyclization reactions. This oxidation effectively removes traces of carbon deposits which contaminate the surface of the particles and decrease their efficiency. It is characteristic of the present types of catalysts that they may be repeatedly regenerated with only a very gradual loss of catalytic efficiency.

During oxidation with air or other oxidizing gas mixture in regenerating partly spent material, there is evidence to indicate that when the lower oxides are employed, they are to a large extent, if not completely, oxidized to higher oxides which combine with basic carriers to form compounds of variable composition. Later these compounds are decomposed by contact with reducing gases in the first stages of service to reform the lower oxides and regenerate the real catalyst and hence the catalytic activity.

Example I

A n-hexane obtained by the careful fractionation of a Pennsylvania crude oil was found to have a boiling point of 68.8° C. and a refractive index of 1.3768 which corresponds closely to the properties of the pure compound.

This material was vaporized and passed over a granular catalyst comprising an alumina base supporting about 4% by weight of chromium sesquioxide, using a temperature of 530° C., substantially atmospheric pressure, and a time of contact of 20 seconds. The yield of pure benzene in a single pass under these conditions was found to be 50% by weight of the normal n-hexane charged. By proper fractionation of products and recycling of the unconverted material the ultimate yield of benzene was finally raised to 80%.

Example II n-Heptane was treated with the same type of catalyst as in Example I at a temperature of 550° C., substantially atmospheric pressure and 10 seconds contact time. The yield of toluene on a once-through basis was found to be 50% by weight and again it was found that by recycling the unconverted n-heptane that the yield of the desired toluene could ultimately be brought to 80%.

Example III

The general procedure in the manufacture of the catalyst was to dissolve ammonium molybdate in concentrated ammonia and utilize this solution as a means of adding molybdenum oxides to a carrier. 20 parts by weight of ammonium molybdate was dissolved in about 50 parts by weight of concentrated aqueous ammonia and the solution then diluted by the addition of approximately one equal volume of water. The solution was then added to about 250 parts by weight of activated alumina which had been produced by calcining bauxite at a temperature of about 700° C. followed by grinding and sizing to produce particles of approximately 8–12 mesh. Using the proportions stated the alumina exactly absorbed the solution and the particles were first dried at 100° C. for about two hours and the temperature was then raised to 350° C. in a period of eight hours. After this calcining treatment the particles were placed in a reaction chamber and the molybdenum oxides reduced in a current of hydrogen at about 500° C., when they were then ready for service.

The vapors of n-hexane were passed over the catalyst at a temperature of 505° C. and substantially atmospheric pressure, using a rate which corresponded to a time of contact of about 16 secs. The yield of pure benzene under these conditions was found to be 50% by weight of the normal n-hexane charged. By recycling of the unconverted material the ultimate yield of benzene was raised to 80%.

Example IV n-Heptane was treated with the same type of catalyst as in Example III at a temperature of 555° C., substantially atmospheric pressure and 11 secs. contact time. The yield of toluene on a once-through basis was found to be 50% by weight and again it was found that by recycling the unconverted n-heptane that the yield of the desired toluene could ultimately be brought to 80%.

Example V

The procedure in the manufacture of the catalyst was to dissolve ammonium tungstate in water and utilize this solution as a means of adding tungsten oxides to a carrier. 15 parts by weight of ammonium tungstate was dissolved in about 100 parts by weight of water and the solution was then added to about 250 parts by weight of activated alumina which had been produced by calcining bauxite at a temperature of about 700° C., followed by grinding and sizing to produce particles of approximately 8-12 mesh. Using the proportions stated the alumina exactly absorbed the solution and the particles were first dried at 100° C. for about two hours and the temperature was then raised to 350° C. in a period of eight hours. After this calcining treatment the particles were placed in a reaction chamber and the tungsten oxides reduced in a current of hydrogen at about 500° C., when they were then ready for service.

n-Hexane was vaporized and passed over the granular catalyst using a temperature of 520° C., substantially atmospheric pressure, and a time of contact of 20 seconds. The yield of pure benzene under these conditions was found to be 46% by weight of the normal n-hexane charged. By recycling of the unconverted material the ultimate yield of benzene was raised to 76%.

Example VI n-Heptane was treated with the same type of catalyst as in Example V at a temperature of 570° C., substantially atmospheric pressure and 20 seconds contact time. The yield of toluene on a once-through basis was found to be 46% by weight and again it was found that by recycling the unconverted n-heptane that the yield of the desired toluene could ultimately be brought to 76%.

Example VII

To illustrate the results obtainable in the direct conversion of olefins to aromatics, the conversion of 1-hexene to benzol may be considered. Using a catalyst prepared generally in accordance with Example I, the hexene was passed over the granular material at a temperature of approximately 500° C., atmospheric pressure and a time of contact of about 16 seconds which procedure produced a once-through yield of benzol of approximately 75%. Fractionation and recycling brought the ultimate yield up to over 90%.

Example VIII

This example is given to illustrate the direct formation of toluene from n-heptene, which conversion was accomplished using the catalyst similar to that described under Example II, a temperature of 510° C., atmospheric pressure and a time of contact of approximately 20 seconds. The once-through yield of toluene was 76% and the ultimate yield was in the neighborhood of 93-95% by recycling unconverted olefin.

The foregoing specification describing the character of the invention and the limited numerical data introduced in the examples will suffice to show its practical importance although the broad scope of the invention is not to be unduly circumscribed by either section.

I claim as my invention:

1. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C. for a period of time of about 6 to 50 seconds, in the presence of a compound of a metal from the left hand column of Group VI of the periodic table and selected from the class consisting of chromium, molybdenum, tungsten and uranium.

2. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C. for a period of about 6 to 50 seconds, in the presence of an oxide of a metal from the left hand column of Group VI of the periodic table and selected from the class consisting of chromium, molybdenum, tungsten and uranium.

3. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C. for a period of time of about 6 to 50 seconds, in the presence of a solid granular catalyst comprising essentially a major proportion of a carrier of relatively low catalytic activity supporting a minor proportion of a compound of a metal from the left hand column of Group VI of the periodic table and selected from the class consisting of chromium, molybdenum, tungsten and uranium.

4. A process for the production of aromatic hydrocarbons from aliphatic hydrocarbons of from six to twelve carbon atoms, which comprises dehydrogenating and cyclicizing the aliphatic hydrocarbon by subjection to a temperature of the order of 400 to 700° C. for a period of about 6 to 50 seconds, in the presence of a solid granular catalyst comprising essentially a major proportion of a carrier of relatively low catalytic activity supporting a minor proportion of an oxide of a metal from the left hand column of Group VI of the periodic table and selected from the class consisting of chromium, molybdenum, tungsten and uranium.

ARISTID V. GROSSE.